April 13, 1965 G. D. DUMBAUGH 3,178,068
APPARATUS FOR CONVEYING A COLUMN OF MATERIAL
DOWNWARD AT A UNIFORM RATE
Filed Nov. 27, 1963 3 Sheets-Sheet 1

INVENTOR.
GEORGE D. DUMBAUGH
BY Marshall, Wilson & Yeasting
attorneys

INVENTOR.
GEORGE D. DUMBAUGH

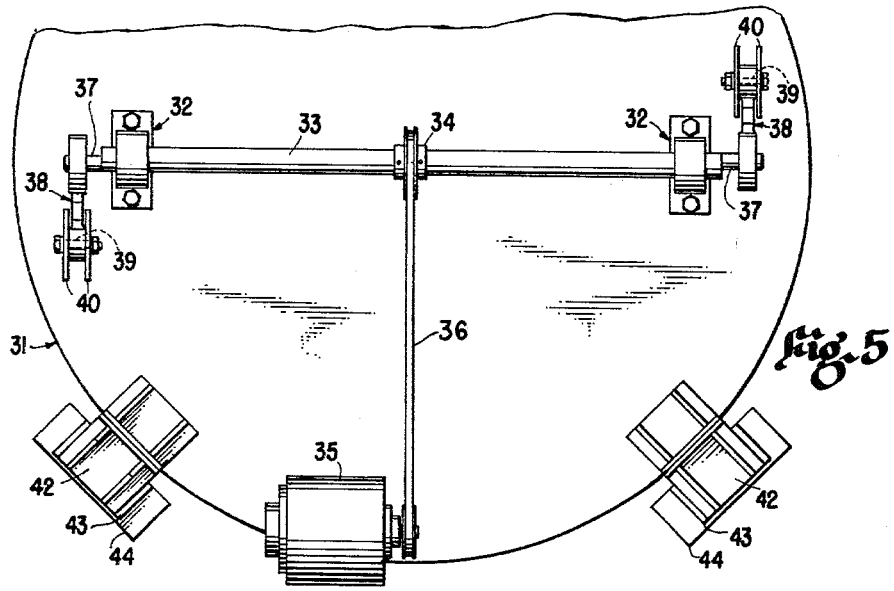
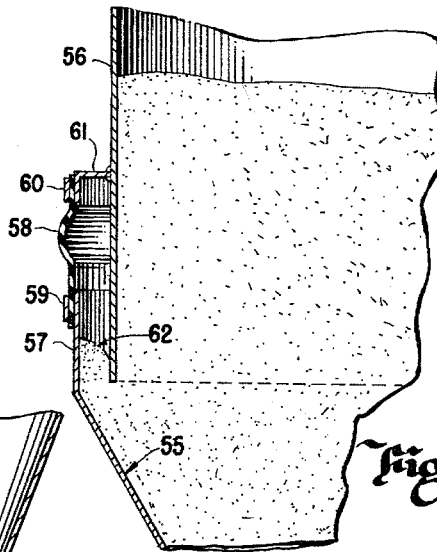
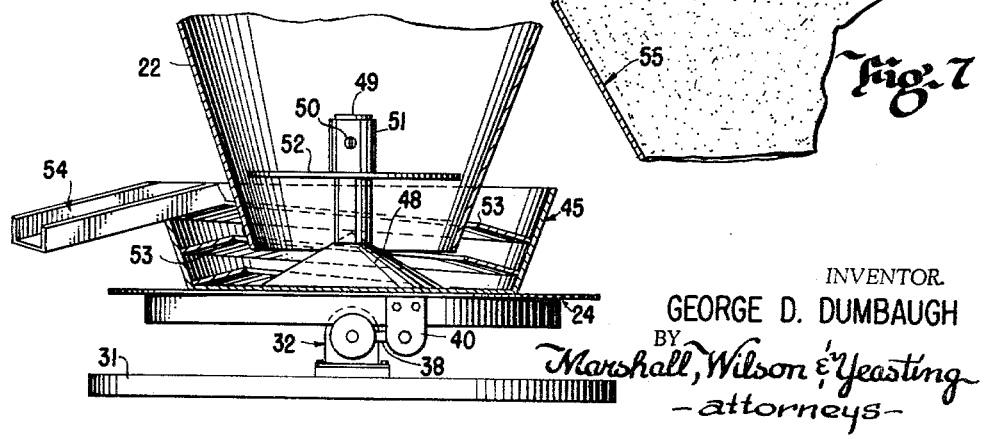
INVENTOR.
GEORGE D. DUMBAUGH

United States Patent Office 3,178,068
Patented Apr. 13, 1965

3,178,068
APPARATUS FOR CONVEYING A COLUMN OF MATERIAL DOWNWARD AT A UNIFORM RATE
George D. Dumbaugh, Jeffersonville, Ind., assignor to Carrier Manufacturing Co., Jeffersonville, Ind., a corporation of Kentucky
Filed Nov. 27, 1963, Ser. No. 326,477
5 Claims. (Cl. 222—161)

The invention relates to an apparatus for conveying a column of material downward at a uniform rate.

When solid materials such as granular or fibrous solids or small parts are used in manufacturing processes, the materials are usually supplied to the processes from storage bins or hoppers. The materials can be supplied from the storage bins or hoppers by gravity, but it is necessary that the materials be supplied to the manufacturing processes from the storage bins or hoppers at a uniform rate.

Many solid materials are not free-flowing, and it is very difficult to supply such materials from hoppers at a uniform rate. A material which is not free-flowing tends to bridge and pack in a hopper, and it is often difficult to discharge such a material from the outlet of a hopper in any form other than masses or agglomerations. In addition, a finely divided material often will bridge in a hopper temporarily and then will surge through the hopper outlet like a liquid.

In an attempt to cause materials to flow from hoppers at a uniform rate, various arrangements for vibrating hoppers have been devised, such as the arrangements shown in U.S. Patents Nos. 2,246,497 and 3,078,015. However, there are many materials which cannot be caused to flow uniformly from a hopper by any arrangement heretofore known, and it has been necessary to feed such materials into manufacturing processes by hand or by expensive feeding apparatus.

The principal object of the invention is to provide a novel apparatus for conveying a column of material downward at a uniform rate. More specific objects and advantages are apparent from the following description, in which reference is had to the accompanying drawings illustrating preferred embodiments of the invention.

The present apparatus for conveying a column of material downward at a uniform rate employs a helical vibratory movement having a vertical component and having another component consisting of oscillation about a vertical axis. It is known to impart a helical vibratory movement to a helical conveyor consisting of a helical trough along which material is caused to flow. In this known type of helical conveyor in which a helical trough is subjected to a helical vibratory movement, the material is thrown tangentially in the trough at the end of each upward helical stroke of the vibratory movement. In this way all the material in the helical trough is propelled a short distance along the trough at the end of each helical upward stroke, so that the helical vibratory movement causes the material to move progressively along the trough in one direction. If the helical upward stroke is a clockwise movement, the material will be moved clockwise along the helical trough. Conversely, if the helical upward stroke is a counterclockwise movement, the material will be moved counterclockwise along the helical trough.

In such a helical vibratory conveyor the helical trough usually is wound in such a direction as to cause the material to be conveyed upward along the trough. However, in some cases the helical trough is wound in the opposite direction so as to cause the material to be conveyed downward along the helical trough, as illustrated in FIGS. 4, 5 and 9 of U.S. Patent No. 2,658,609. In the use of any such helical downward conveyor, however, it would still be necessary to supply material to the helical trough from a storage bin or hopper. FIG. 6 of the same patent shows an apparatus by means of which a similar helical vibratory movement is imparted to a drum during the process of filling the drum with a solid material, in order to pack the material tightly so as to permit the drum to hold a maximum amount of the material.

In an apparatus embodying the present invention, a column of material is conveyed downward at a uniform rate while it is held in a vessel that is subjected to a helical vibratory movement. The vessel in the present apparatus is tapered downwardly and inwardly. For best results, the average slope of the side walls of the vessel in the present apparatus, from the extreme lower end of a column of material filling the vessel to the extreme upper end of the column, should be not less than 25° and not more than 75° from the vertical.

The primary effect of the helical vibratory movement of the vessel in an apparatus embodying the invention is to cause the material to flow spirally up the sloping side walls of the vessel. The reason for the spiral flow of the material up the sloping side walls of the vessel in an apparatus embodying the invention may be explained as follows: Each time the vessel reaches the lower end of its helical vibratory stroke, the vessel quickly reverses its movement and begins its helical upward movement. The effect of the quick reversal of the movement of the vessel at the lower end of its helical vibratory stroke is to propel forcibly in a helical upward direction the material overlying the sloping side walls of the vessel. Then when the vessel reaches the upper end of its helical vibratory stroke, the material overlying the sloping side walls of the vessel, which has been propelled in a helical upward direction, is in effect released or thrown free from the sloping side walls while the vessel is terminating its helical upward movement and beginning its helical downward movement. The direction in which the particles of material overlying the sloping side walls of the vessel are thus thrown at the end of the helical upward movement of the vessel is a tangentially upward direction. The overall result of the successive tangentially upward movements of the particles of material overlying the sloping side walls which occur at the ends of the successive helical upward movements of the vessel is a general spirally flow of the material up the sloping side walls.

In an apparatus embodying the invention, the vessel which is subjected to a helical vibratory movement has an outlet for discharge of material at the extreme lower end of a column of material in the vessel. As the result of the discharge of material from the outlet at the extreme lower end of the column of material in the vessel, there is superimposed upon the primary spiral flow of the material up the sloping side walls of the vessel a secondary downward flow of the material toward the center of the vessel and toward the outlet.

Thus although the primary flow of the material in an apparatus embodying the invention consists of a spiral flow up the sloping side walls of the helically vibrated vessel, the overall effect of the apparatus is to convey downward at a uniform rate the column of material in the vessel, because of the secondary downward flow of the material toward the center of the vessel which is caused by the presence of an outlet at the extreme lower end of the column of material in the vessel.

The primary spiral flow of the material up the sloping side walls of the vessel in an apparatus embodying the invention has a very important function in that it constantly tends to expand the peripheral layers of the material at the sides of the vessel as such layers are acted upon by the helical vibratory movement of the vessel. This constant spiral movement and expansion of the peripheral layers of the material in the vessel prevents the material from packing or jamming, particularly at the bottom of the vessel where jamming would be likely to occur in the absence of such spiral movement. At the same time, it is impossible for a bridge of material to form in the vessel, because the spiral movement of the material up the sloping side walls of the vessel would crumble the foundations of any such bridge.

The systematic circulation that has been described, which occurs in a column of material in an apparatus embodying the invention, prevents any agglomeration of the material and causes the material to be discharged at a uniform rate from the outlet at the lower end of the column of material. The end result is to convey the column of material in the apparatus downward at a uniform rate.

The circulation of the material which is produced in an apparatus embodying the invention is quite different from the movement of the material that occurs in the known vibratory hoppers, such as the conical vibratory hopper shown in U.S. Patent No. 2,246,497. The vibration of the conical hopper shown in that patent merely causes the material in the hopper to settle gradually toward the outlet at the bottom of the hopper. As the material settles in the conical vibratory hopper of this patent, it tends to become compressed because the width of the hopper decreases toward the bottom of the hopper.

Thus trouble is experienced with jamming of the material at the bottom of the conical vibratory hopper shown in Patent No. 2,246,497. Other vibratory hoppers have been constructed with vertical side walls, as shown in U.S. Patent No. 3,078,015, but the problem of discharging material from a relatively small outlet without jamming has remained. This problem has been solved by the present apparatus, which employs a vessel that tapers toward an outlet at the bottom, and which induces a primary spiral flow of the material up the sloping side walls of the vessel.

U.S. Patent No. 2,827,062 discloses a helical conveyor which is subjected to a helical vibratory movement and which includes a central supply vessel that participates in the helical vibratory movement. However, the central supply vessel shown in this patent is essentially in the form of an elongated vertical pipe. In spite of the helical vibratory movement of this elongated vertical pipe, there would be little or no progressive rotation of the material relative to the pipe, particularly in the case of the non-freely flowing type of material with which the present invention is concerned. In fact, the movement of the material in the central supply vessel shown in this patent would consist essentially of a gradual settling of the material, like the movement of the material in the known vibratory hoppers.

FIG. 1 of the drawings is a plan view of a preferred form of apparatus embodying the invention;

FIG. 5 is a plan view of the base of the device shown in FIG. 4;

FIG. 6 is a fragmentary elevation, partly in section, on a reduced scale of the device shown in FIG. 4; and FIG. 7 is a fragmentary vertical section of a further modified form of device embodying the invention.

These specific drawings and the specific description that follows are intended to disclose and illustrate and not to limit the invention.

Figure 1:
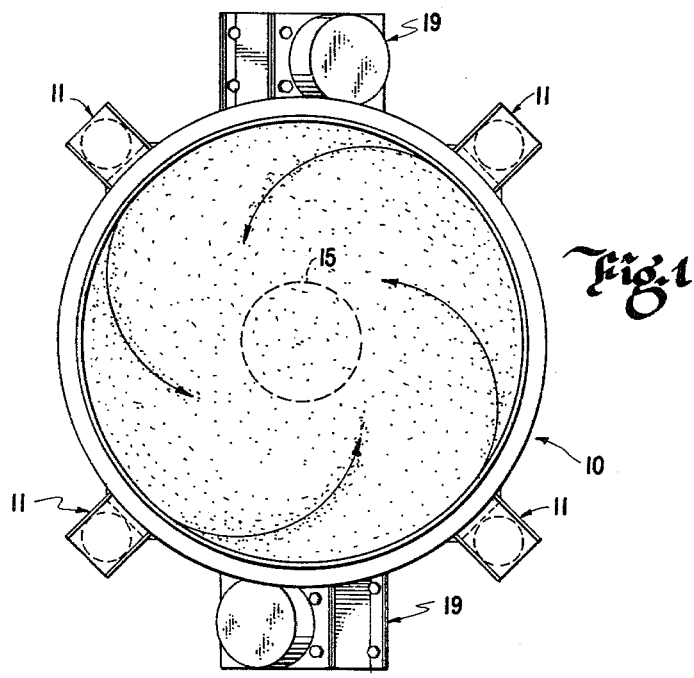
Figure 2:
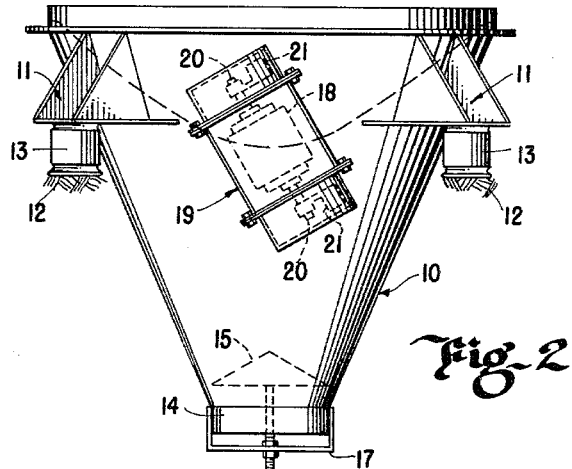
FIG. 2 is an elevation of the apparatus shown in FIG. 1.

The apparatus shown in FIGS. 1 and 2 comprises a hopper 10 in the form of a frustum of a cone which is provided with four mounting brackets 11. Each of the mounting brackets 11 is mounted upon a fixed support 12 by means of a flexible rubber bag 13 which contains air and liquid under pressure. These flexible rubber bags support the hopper resiliently and provide the hopper with a limited freedom of movement in all directions.

In place of the flexible rubber bags 13 it is possible to employ any other type of mounting that provides the hopper with a limited freedom of movement. For example, the hopper may be hung or supported upon springs. The rubber bags 13 are advantageous because they have an isolating or cushioning action which minimizes the transmission of vibratory forces into a building or other structure in which the hopper is located.

The hopper shown in FIG. 2 is provided at its lower end with a short cylindrical section 14 which is open at the bottom to permit the material to be discharged. In order that the rate of flow of material from the hopper may be adjusted, a conical baffle 15 is mounted on a threaded stem 16 which passes through and is adjustably secured to a U-shaped bracket 17 fixed to the cylindrical section 14.

The frusto-conical hopper 10 constitutes a preferred form of movable vessel for holding a column of material while the material is being conveyed downward, but other forms of movable vessel may be employed. In any event, however, the side walls of the movable vessel are tapered downwardly and inwardly.

The side walls of the movable vessel do not need to have a uniform slope, as in the hopper shown in FIG. 2, but may have a varying slope, as in the hoppers described in U.S. Patent 3,071,297.

In a device embodying the present invention, the movable vessel is provided with mechanism for imparting to the vessel a helical vibratory movement having a vertical component and having another component consisting of oscillation of the vessel about its vertical axis. In the device shown in FIGS. 1 and 2, this mechanism comprises a pair of electrical motors 18 secured to opposite sides of the hopper 10, each of which is enclosed in a sealed housing 19. The shaft 20 of each of the motors 18 is eccentrically loaded at both ends by a pair of weights 21 fixed to the shaft.

The motors 18 are driven in the same direction; for example, they both may be driven clockwise as viewed from above. As soon as the motors 18 are started they lock into synchronism with one another, with the weights 21 phased in such a manner that all the weights 21 are directed inward toward the vertical axis of the hopper at the same instant, and are directed outward away from the vertical axis of the hopper at the same instant. With the weights 21 phased in this manner, the weights during each complete rotation of the shafts 20 first produce a couple tending to rotate the hopper in one direction and then produce a couple tending to rotate the hopper in the opposite direction. Thus with each complete rotation of the motor shafts 20, the hopper 10 executes one complete oscillation on its vertical axis.

The motor shafts 20 are inclined at equal and opposite angles to a plane passing through the vertical axis of the hopper and through the midpoints of the two motor shafts. Because of this inclination of the motor shafts, each complete rotation of the motor shafts not only causes one complete oscillation of the hopper on its vertical axis but also causes one complete vertical reciprocation of the hopper. The resultant of the combined oscillation and vertical reciprocation of the hopper is a helical vibratory movement of the hopper.

In place of the mechanism shown in FIGS. 1 and 2, any other desired mechanism may be employed for imparting a helical vibratory movement to the movable vessel in an apparatus embodying the invention. Various other mechanisms for imparting such a movement are known and are used for driving helical vibratory conveyors.

In order that the flexible rubber bags 13 may perform their function of minimizing the transmission of vibratory forces into the foundation on which the apparatus is supported, the natural frequency of the system consisting of the flexible rubber bags 13 and the mass supported thereon preferably is substantially below the frequency at which the hopper 10 is vibrated by the motors 18.

Figure 3:
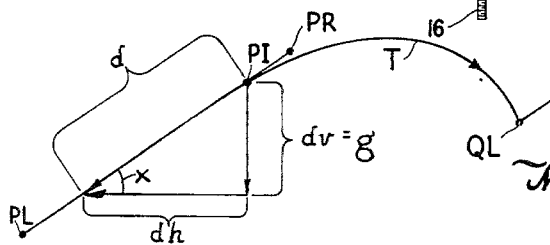
FIG. 3 is a diagram illustrating the motion that may be imparted to a particle of material in the apparatus.

FIG. 3 illustrates the manner in which a particle resting on the sloping side wall of the hopper 10 is propelled during the helical upward movement of the hopper. The line PL–PR represents the path of vibratory movement of a point on the interior of the sloping side wall of the hopper 10. Although the path of vibratory movement actually is helical, FIG. 3 is shown as a projection on a vertical plane so that the path of vibratory movement PL–PR is shown as a straight line.

As a point on the sloping side wall of the hopper 10 travels through the path PL–PR from left to right during the vibratory movement of the hopper, a particle of material resting on the side wall of the hopper at this point tends to travel through the same path. However, as the hopper approaches the upper end of its vibratory movement, its upward movement is decelerating. If the deceleration of the upward movement of the hopper is great enough relative to the downward acceleration of a particle resting on the side wall of the hopper that is produced by the force of gravity acting upon the particle, the hopper will be decelerated and stopped so quickly that at the upper extremity of its vibratory movement, the force of gravity acting upon the particle will not cause the particle to remain in contact with the side wall of the hopper, and the particle will in effect become a projectile traveling in a trajectory such as that indicated as T in FIG. 3.

Even though the path of vibratory movement PL–PR actually is a helical path, the trajectory T is tangential in that it lies in a vertical plane which is tangent to the helix PL–PR at the point PI (the point at which the particle leaves the surface of the sloping side wall of the hopper during the upward helical movement of the hopper).

FIG. 3 includes a vector diagram in which the vector $d$ represents the deceleration of the hopper at the instant when a point on the side wall of the hopper is at the position PI. The vector $d$ may be resolved into a vertical component $dv$ and a horizontal component $dh$. The inertia of a particle of material resting on the side wall of the hopper at the position PI tends to keep the particle moving in a straight line in the direction and at the velocity at which the particle is traveling at the position PI. Thus the horizontal component $dh$ is the component of the deceleration $d$ which tends to cause the inertia of the particle to slide the particle forward along the side wall of the hopper, and the vertical component $dv$ is the component of the deceleration $d$ which tends to cause the inertia of the particle to lift the particle off the side wall of the hopper.

In the case illustrated in FIG. 3, the vertical component $dv$ of the deceleration $d$ of the hopper at the instant when the particle is at the position PI is equal to the downward acceleration $g$ produced by the force of gravity acting upon the particle. In other words, $d \sin x$ equals $g$. Thus the pressure of the particle against the side wall of the hopper is zero at the position PI. Then as the hopper continues to travel upward in its vibratory movement, the deceleration of the hopper will increase until it reaches a maximum at the instant when the hopper reaches the upper extremity of its stroke. Accordingly, after the particle has moved past the position PI the downward acceleration produced by gravity will not cause the particle to remain in contact with the side wall of the hopper.

In the case illustrated in FIG. 3, the conditions are such that the particle after passing the position PI will travel through the trajectory T, and the impact of the particle on the side wall of the hopper at the position QL will occur at the instant when the hopper reaches the lower extremity of its reverse movement. Immediately after the particle strikes the side wall of the hopper at the position QL, it will remain on the side wall of the hopper while the hopper executes the initial part of its succeeding upward movement, and will be subjected to forces similar to those to which it was subjected during the preceding stroke, so that the particle then will follow a path as indicated in FIG. 3 which is similar to the path that the particle followed in traveling from the position PL to the position QL. In the case illustrated in FIG. 3, it is assumed that there is no bouncing or slipping of the particle on the side wall of the hopper.

The vertical component of the maximum deceleration which is attained at the instant when the hopper reaches the upper extremity of its stroke may be computed in inches per second per second from the equation $$dv_{\max.} = 19.74 f^2 s_v$$

in which $f$ is the frequency of vibration in cycles per second and $s_v$ is the vertical component of the stroke (for example, $PL-PR \sin x$) in inches.

The foregoing explanation of the vector diagram in FIG. 3 shows that a particle resting on the side wall of the hopper will not leave the side wall of the hopper during the upward vibratory movement of the hopper unless $dv_{\max.}$ is greater than $g$. However, it is not necessary that a particle resting on the side wall of the hopper actually leave the side wall of the hopper as the hopper approaches the upper end of its vibratory movement, because of the slippage of particles resting on the side wall of the hopper which occurs as the deceleration of the hopper approaches a maximum near the upper end of the vibratory movement of the hopper. This slippage occurs as the hopper approaches the upper end of its vibratory movement because of the fact that the inertia of the particles tends to keep the particles moving at a constant velocity. As the hopper approaches the upper end of its vibratory movement, the velocity of the hopper is decreasing rapidly, and the particles tend to maintain their velocity and direction of movement and thus slide forward as the movement of the hopper decelerates.

It should be noted also that the deceleration of the hopper as it approaches the upper end of its stroke tends to counteract the force of gravity and thus tends to reduce the pressure of the particles against the side wall of the hopper, so as to reduce friction and enable the particles to slide forward along the side wall of the hopper. On the other hand, during the second half of the downward stroke of the hopper, the deceleration of the hopper is in the opposite direction and thus adds to the pressure of the particles against the side wall of the hopper that is caused by the force of gravity. Thus the particles, which are allowed to slide forward near the end of the upward stroke of the hopper, are held tightly against the side wall of the hopper near the lower end of the stroke and are prevented from sliding backward under the action of the forces prevailing near the lower end of the stroke. The forward slippage of particles on the side wall of the hopper which is thus permitted near the end of the upward stroke, while backward slippage is prevented near the lower end of the stroke, is obtained even when the deceleration of the hopper is not great enough to permit the particles to travel through the air in a trajectory such as the trajectory T in FIG. 3.

For best results, the angle $x$ should be at least 5°. The preferred range for the angle $x$ is from 10° to 30°. However, the angle $x$ may be as great as 40°, and in some cases may be as great as 80°. In any event, the angle $x$ is an acute angle.

Preferably the frequency of vibration of the hopper is not more than 2000 cycles per minute, which is equal to 33⅓ cycles per second. Once the frequency of vibration and the angle $x$ are established, the length of stroke necessary to give the desired maximum acceleration can be determined from the above equation. The desired length of stroke can be obtained by varying the size and eccentricity of the weights 21. However, to produce the desired helical vibratory movement, the size and eccentricity of all four of the weights 21 should be the same.

In order to obtain the best results in the practice of the invention, it is desirable that the vertical component of the maximum acceleration of the hopper be at least as great as the acceleration of gravity, which is normally about 386 inches per second per second. The length of stroke required to provide a given maximum acceleration of the hopper increases as the frequency of vibration decreases.

Preferably the hopper in an apparatus embodying the invention is vibrated at a relatively low frequency with a relatively long stroke, ranging from 3/16 inch to one inch, measured at the upper edge of the hopper. For example, the hopper may be vibrated with a stroke of 3/8 inch at a frequency as high as 1200 cycles per minute or as low as 400 cycles per minute. With motors operating at a speed of 900 r.p.m., the stroke preferably is from 3/16 inch to 1/4 inch.

The primary effect of the helical vibratory movement of the hopper 10, as illustrated in FIG. 3, is to cause a general spiral flow of the material up the sloping side walls of the hopper. This spiral flow of the material up the sloping side walls tends to raise the level of the material adjacent the side walls somewhat above the level of the material in the central portion of the hopper 10, as shown by the dotted line in FIG. 2. At the same time, the level of the material in the central portion of the hopper is further depressed by the discharge of material at the bottom of the hopper. Such discharge of material at the bottom of the hopper superimposes upon the primary spiral flow of the material up the sloping side walls of the hopper a secondary downward flow of the material toward the center of the hopper.

The flow of material produced in the practice of the present invention by the superimposing of a secondary downward flow of the material upon the primary spiral flow of the material up the sloping side walls is a unique type of flow, indicated by the arrows in FIG. 1, which is unprecedented in the conveying of solid materials or in the discharging of solid materials from a hopper. The unique type of flow which is produced in the practice of the invention may be described as an induced vortex or whirlpool. The induced vortex produced by the present apparatus resembles the natural vortex which often occurs spontaneously in a tank of liquid when the liquid is being discharged by gravity through an outlet. However, a vortex does not occur spontaneously in solid material which is being discharged by gravity through an outlet. The formation of a vortex in liquid which is being discharged through an outlet is disadvantageous in that it actually retards the discharge of the liquid. In contrast, the induced vortex which is produced in the practice of the invention is highly advantageous in that it makes possible the conveying at a uniform rate of various materials which heretofore have been difficult to convey and have been impossible to convey at a uniform rate. As hereinbefore explained, the vortex-like movement produced in the present apparatus causes a material to be discharged smoothly and rapidly by gravity, without packing, jamming, bridging or agglomeration.

Materials that are handled successfully by the present apparatus include tacky materials which tend to cake, plastic materials of putty-like consistency, clay, wet sand, chips, fibers and relatively long stems.

An incidental advantage of the induced vortex-like movement of the material which is produced in an apparatus embodying the invention is that such movement has a very efficient scouring action, so that an apparatus embodying the invention is self-cleaning.

Any desired type of gate or valve may be used to adjust the rate of flow of material from the outlet of the vessel in the present apparatus. However, a central conical baffle such as that indicated in FIG. 2 is preferred. The central conical baffle 15 helps to keep the material circulating in the lower part of the hopper 10. The helical vibratory movement of the cone 15 tends to induce a spiral flow of the material resting upon the cone, but in this case the spiral flow induced by the helical vibratory movement is a flow down the sloping surface of the cone instead of an upward flow. In any case, the combined action of the cone 15 and the hopper 10 is to maintain a circular flow of the material around the cone. Excellent results are thus obtained in maintaining a constant rate of discharge of the material from the hopper.

The normal range of sizes of the hopper shown in FIGS. 1 and 2 is from about 15 cubic feet to about 600 cubic feet.

Figure 4:
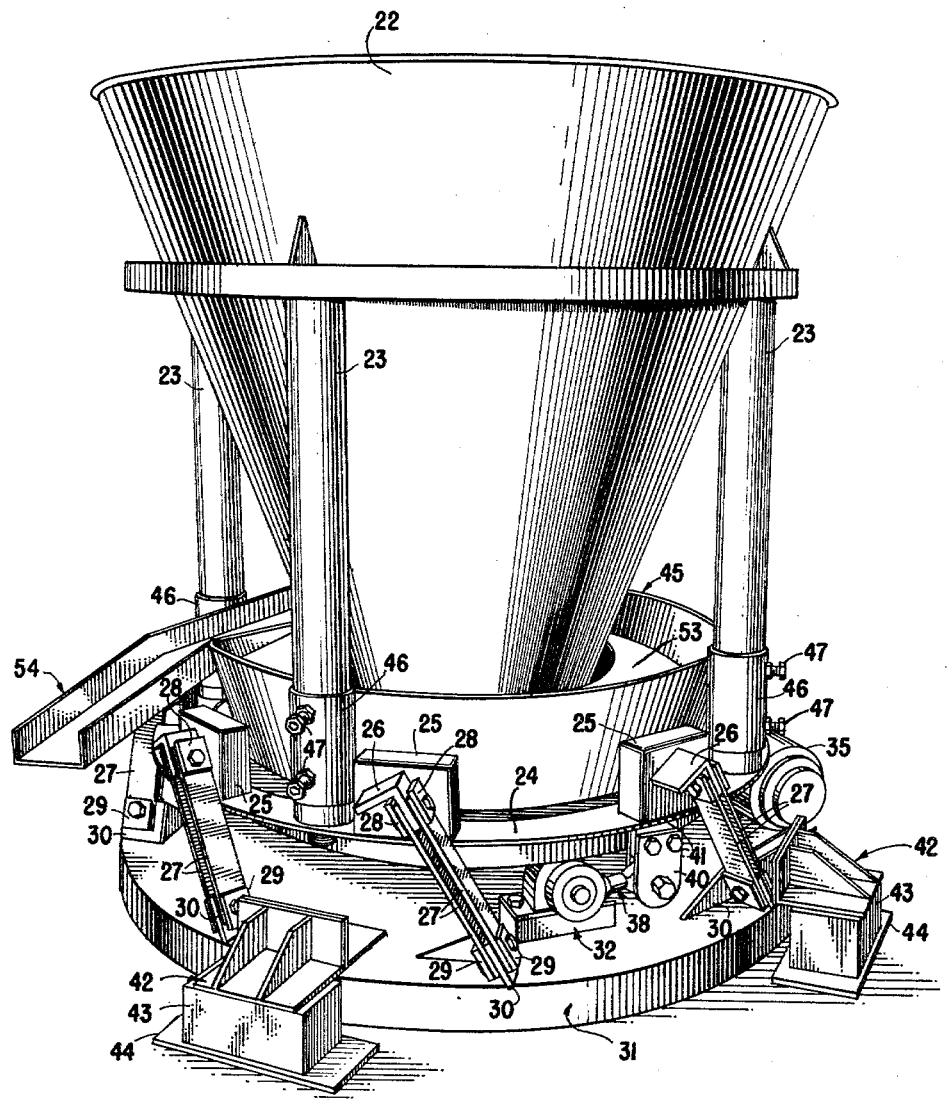
FIG. 4 is a perspective of a modified form of device embodying the invention.

The apparatus shown in FIGS. 4, 5 and 6 comprises a hopper 22 supported on vertical posts 23 which are erected on a circular platform 24. Secured to and extending around the upper surface of the platform 24 are a series of blocks 25, each of which is provided with an inclined angle bracket 26. The upper ends of a pair of leaf springs 27 are clamped to each of the angle brackets 26 by means of a pair of clamping plates 28. The lower ends of each pair of leaf springs are clamped by means of a pair of similar clamping plates 29 to another inclined angle bracket 30 which is secured to the base 31 of the machine.

The pairs of leaf springs 27, which may be of any suitable spring material, such as steel or laminated glass fiber, constitute the sole support for the circular platform 24 and the hopper 22.

A pair of bearings 32 mounted on the base 31 rotatably support a drive shaft 33. This shaft is driven through a pulley 34 fixed on the shaft, by means of a motor 35 which drives a belt 36 and is mounted on the base 31. Each end of the drive shaft 33 is provided with an eccentric extension 37 of reduced diameter, on which is journaled one end of a connecting rod 38. The other end of each of the connecting rods 38 is pivoted upon a rod 39 which is fixed in a pair of plates 40. Each pair of plates 40 in turn is fixed to a bracket 41 secured to the underside of the circular platform 24.

The eccentrics 38 translate the rotary motion of the drive shaft 33 into vibratory motion of the circular platform 24 and hopper 22. The leaf springs 27 which support the platform 24 are flexed during such vibratory motion, and these leaf springs determine the path through which the platform 24 and the hopper 22 are vibrated. Because of the fact that the leaf springs 27 are inclined to the vertical, the movement imparted to the platform 24 and hopper 22 is a helical vibratory movement, similar to the helical vibratory movement of the hopper 10 shown in FIGS. 1 and 2. Thus the operation of the device shown in FIG. 4 is similar to the operation of the device shown in FIG. 2, although a different type of mechanism is used to produce the helical vibratory movement in the device of FIG. 4.

In order to minimize the transmission of vibratory forces into a building in which the device of FIG. 4 is located, the base 31 is provided with mounting brackets 42 resting upon flexible rubber blocks 43 which in turn are mounted upon plates 44 supported upon a concrete floor or other foundation.

The device of FIG. 4 is provided with additional apparatus to assist in the discharge of the material. Such additional apparatus includes a pan 45 which is secured to and supported by sleeves 46 surrounding the posts 23. Set screws 47 are provided to secure the sleeves 46 and the pan 45 at an adjustable height on the posts 23. To assist in guiding the material discharged from the hopper 22, the bottom of the pan 45 is provided with a central conical convexity 48, on which is fixed a central post 49. Fixed at an adjustable height on the post 49 by means of a set screw 50 is a sleeve 51 to which is secured a disc 52 that corresponds in function to the conical baffle 15 shown in FIG. 2.

Material discharged from the hopper 22 is carried upward by means of a shelf 53 which is arranged substantially perpendicular to the inclined side wall of the pan 45 and which extends spirally upward from the bottom of the pan 45. The helical vibratory movement of the assembly causes the material discharged from the hopper 22 to travel spirally upward along the shelf 53 until it flows through a discharge spout 54.

The central disc or baffle 52, like the conical baffle 15 of FIG. 2, helps to keep the material circulating in the lower part of the hopper. The helical vibratory movement of the disc 52 causes particles resting upon the disc to travel spirally outward toward the periphery of the disc.

The conical projection 48 in the bottom of the pan 45 also participates in the helical vibratory movement and therefore has an action similar to the action of the conical baffle 15 of FIG. 2. Particles of material are caused to travel spirally down the surface of the conical projection 48 and are thus guided onto the shelf 53. The helical vibratory movement of the pan 45 causes material below the lowest flight of the shelf 53 to travel counterclockwise around the conical projection 48 until the material enters the lowest flight of the shelf 53.

Since the rubber blocks 43 in the device of FIG. 4 correspond in function the flexible rubber bags 13 in the device of FIG. 2, the natural frequency of the system consisting of the flexible rubber blocks 43 and the mass supported thereon preferably is substantially below the frequency at which the hopper 22 is vibrated.

On the other hand, it is desirable that the natural frequency of the system consisting of the leaf springs 27 and the mass supported thereon (including a normal load of material in the hopper 22) be the same as the frequency at which the hopper 22 is vibrated when the motor 35 is operating at its normal speed, in order that the apparatus may operate with a minimum consumption of power.

The hopper 22 is positively vibrated by the connecting rods 38, so that the stroke or amplitude of vibration of the hopper 22 is fixed and is unaffected by any variation in the amount of material in the hopper 22.

A device of the type shown in FIG. 4, in which the hopper had a volume of 21 cubic feet, has been operated successfully at vibratory stroke ⅜ inch in length and at a frequency of 525 to 1,000 cycles per minute. The device has been used to feed a fibrous material of high moisture content at a constant rate which may be as high as 5 cubic feet per minute.

The rate of discharge of material from the spout 54 remains constant so long as the speed of the motor 35 is constant, and the rate of discharge can be varied while the device is operating by varying the speed of the motor 35. The maximum efficiency is obtained when the speed of the motor 35 in r.p.m. is the same as the natural frequency of the system consisting of the springs 27 and the mass supported thereon. Even when the material is being discharged from the spout 54 at a relatively low rate, the material in the hopper 22 continues to circulate as the hopper vibrates, and does not become packed in the hopper.

FIG. 7 illustrates a modification in which the helically vibrated vessel or hopper 55 serves as the bottom of an overlying bin 56. In this case the hopper 55 is provided with an upper cylindrical portion 57 which telescopes with the lower end of the bin 56. In order to provide a dust seal, a flexible sleeve 58 has its lower end clamped by means of a band 59 against the exterior of the cylindrical portion 57 and has its upper end clamped by means of a similar band 60 against a flange 61 which is provided on the exterior of the bin 56.

In the device of FIG. 7, both the hopper 55 and the bin 56 are filled with the material which is to be conveyed downward. The helical vibratory movement of the hopper 55 may cause some material 62 to rise into the space between the cylindrical portion 57 and the lower end of the hopper 56. The material surrounded by the bin 56 is not subject to the action of the helically vibrated hopper 55, so that the surface of the material 62 between the cylindrical portion 57 and the lower end of the bin 56 may be considered to be the extreme upper end of a column of material filling the movable hopper or vessel 55.

In the operation of the device shown in FIG. 7, the flow of the material in the hopper 55 is substantially the same as the flow of the material in the hopper 10 of FIGS. 1 and 2, and material constantly descends from the bin 56 into the hopper 55. Thus in the device of FIG. 7 the hopper 55 is kept constantly filled with the material.

In the device of FIG. 7, the material descending from the bin 56 exerts a certain amount of pressure upon the material filling the hopper 55. This additional pressure may cause additional power to be consumed in producing the helical vibratory movement of the hopper 55. It is desirable that the helical vibratory movement imparted to the hopper 55 have a relatively long stroke and have a maximum acceleration whose vertical component is greater than the acceleration of gravity, so as to impart relatively vigorous motion to the material in the hopper.

When the helical vibratory movement imparted to the hopper 55 has a maximum acceleration whose vertical component is greater than the acceleration of gravity, the hopper 55 in effect is jerked free of the material each time the hopper quickly reverses its direction of movement at the upper end of its vibratory stroke. This action is facilitated by the fact that the side walls of the hopper 55 are sloping rather than vertical side walls. Such jerking free of the hopper 55 at the upper end of each vibratory stroke enables the hopper 55 to take a new grip on the material at the lower end of each vibratory stroke, so that the helical vibratory movement of the hopper 55 keeps the material rotating in the hopper.

An important feature of the apparatus shown in FIG. 7 is that the side walls of the helically vibrated vessel have a substantial slope from the extreme lower end of the column of material filling the helically vibrated vessel to the extreme upper end of the column at 62. This makes it possible to use the available power to impart the desired movement to the entire mass of material filling the helically vibrated vessel 55. In contrast, the vessel to which a helical vibratory movement is imparted in the device shown in U.S. Patent No. 2,827,062 is an integral vessel consisting essentially of a relatively high column having vertical side walls. In that device the helical vibratory movement produces little or no progressive rotation of the mass of material to which it is applied.

In the apparatus shown in FIG. 7, the bin 56 is not vibrated, and the diameter of the bin 56 should be great enough so that there is no danger of bridging of the material in the bin 56 as it gradually descends under the influence of gravity to replenish the material in the hopper 55.

Various other embodiments of the invention may be devised to meet various requirements.

Having described the invention, I claim:

1. A vortex-inducing apparatus for agitating a column of flowable material in a systematic manner to cause it to flow downward, comprising, in combination, a vessel for holding a column of material while the material is flowing downward, without overflow of the material at the top, the side walls of the vessel being rounded in horizontal section and being downwardly and inwardly tapered, a mounting which supports the vessel for limited helical vibratory movement having a vertical component and having another component consisting of oscillation of the vessel on its vertical axis through a fraction of a complete rotation, and mechanism for imparting such a helical vibratory movement to the vessel to produce a rapid intermittent spiral flow of the material, the vessel having an outlet for discharge of the material at the extreme lower end of a column of material in the vessel, whereby there is superimposed upon said intermittent spiral flow a preponderant downward flow of the material toward the center of the vessel, so that the material is agitated and caused to flow through the outlet.

2. A vortex-inducing apparatus as claimed in claim 1 wherein the side walls of the movable vessel, from the extreme lower end of a column of material filling the movable vessel to the extreme upper end of such column, have generally the shape of a frustum of a cone.

3. A vortex-inducing apparatus as claimed in claim 1 wherein the vertical component of the helical vibratory movement imparted to the vessel has a maximum acceleration at least as great as the acceleration of gravity.

4. A vortex-inducing apparatus as claimed in claim 1 wherein the outlet for discharge of material from the movable vessel is substantially centered on the vertical axis of the vessel and a generally horizontal baffle is substantially centered in the vessel above the outlet.

5. A vortex-inducing apparatus as claimed in claim 4 wherein the baffle is an upwardly tapered conical baffle.

References Cited by the Examiner

UNITED STATES PATENTS

| | | | |
|---|---|---|---|
| 2,246,497 | 6/41 | Beck | 222—161 |
| 2,760,504 | 8/56 | Spurlin. | |
| 2,985,280 | 5/61 | Burgess. | |
| 3,050,215 | 8/62 | Williams | 222—161 |
| 3,078,015 | 2/63 | Wahl | 222—161 |
| 3,125,208 | 3/64 | Secunda. | |

EVERETT W. KIRBY, *Primary Examiner.*

RAPHAEL M. LUPO, *Examiner.*